United States Patent [19]

Saeki et al.

[11] 4,064,536

[45] Dec. 20, 1977

[54] VIDEO SCRAMBLER AND DESCRAMBLER APPARATUS

[75] Inventors: Yoshifumi Saeki; Hiroki Uemura, both of Tokyo, Japan

[73] Assignee: Pioneer Electronic Corporation, Inglewood, Calif.

[21] Appl. No.: 654,880

[22] Filed: Feb. 3, 1976

[30] Foreign Application Priority Data

Oct. 2, 1975 Japan .............................. 50-119273

[51] Int. Cl.² ............................................. H04N 1/44
[52] U.S. Cl. ................................... 358/118; 358/120; 358/121
[58] Field of Search ................... 325/308, 62; 358/118, 358/120, 121

[56] References Cited

U.S. PATENT DOCUMENTS

| 3,081,376 | 3/1963 | Loughlin et al. | 178/5.1 |
| 3,729,576 | 4/1973 | Court | 178/5.1 |
| 3,936,593 | 2/1976 | Aaronson et al. | 178/5.1 |

Primary Examiner—S. C. Buczinski
Attorney, Agent, or Firm—Fraser and Bogucki

[57] ABSTRACT

Video signals for television are effectively scrambled and may later be descrambled without the presence of annoying visual disturbances by the introduction of a superposed distorted sine wave in synchronism with the horizontal synchronizing signal, in a "gray sync" mode of operation. Thereafter, the received signal may be normalized and descrambled by compensatory and synchronous modulation. Advantageously, the sinusoidal variation may be imposed both upon aural and visual components of the signal, and the aural AM signal may be utilized as a reference in descrambling the visual component.

12 Claims, 5 Drawing Figures

VIDEO SCRAMBLER AND DESCRAMBLER APPARATUS

BACKGROUND OF THE INVENTION

This invention relates to a scramble apparatus for distorting video signals and to a descrambler apparatus for restoring the same.

In order to feed specific video signals to only specific subscribers among the subscribers in a CATV system, it is necessary to transform the aforementioned video signal to an unreproducible condition for those subscribers other than the specific subscribers. For this purpose, means are utilized in which the specific video signals are distorted by the scrambler apparatus at the site of the transmitter during the transmission of the video signals, while the thus distorted video signals are restored into normal form by descrambler apparatus at the sites of specific subscribers.

It is known to provide scrambling and descrambling by what is called an AM gray sync system. That is, in the AM gray sync system, an arrangement is provided wherein at the transmitter, the relationship of the modulation levels between the horizontal synchronizing signal and the video signal in a RF stage is inverted so that the amplitude of the horizontal synchronizing signal is less than is previously experienced while the amplitude of the video signal is greater than is previously experienced. More specifically, a sine wave (an encode signal) of 15.75 KHz (or integral-fold thereof), which is in synchronism with the horizontal synchronous signal, is formed, by which the video signal undergoes AM modulation to thereby carry out scrambling; and to return this to is initial condition, a sine wave (a decode signal) of 15.75 KHz (or integral-fold thereof), of which the phase is reversed with respect to the firstly mentioned encode signal, is formed at the receiver, by which the scrambled video signal is restored to thereby carry out descrambling. In this case, however, there is a disadvantage such that the descrambled RF video signal is not completely identical to the unscrambled signal and includes a ripple. For example, let $A \cos \omega t$ represent the RF video signal and $B \sin \theta t$ the encode signal, then the scrambled signal is given by $$(A+B \sin \theta t) \cos \omega t = A(1 + m \sin \theta t) \cos \omega t,$$

where $m = B/A$. This is descrambled by the decode signal, which is reversed in phase with respect to the encode signal, then the resulting signal is given by $$A(1 + m \sin \theta t)(1 - m \sin \theta t) \cos \omega t = A(1 - m^2 \sin^2 \theta t) \cos \omega t$$

indicating that the term of $m^2 \sin^2 \theta t$ remains relative to the original signal $A \cos \omega t$. This ripple component is determined by the square of the modulation degree $m$, but preferably the modulation degree $m$ is greater in terms of the object inherent in the scrambler. However, because the ripple component produced in the descrambled signal becomes greater as the modulation degree $m$ increases, the result is that the reproduced image suffers from longitudinal bright and dark stripes, resulting in an extreme difficulty in viewing the image.

SUMMARY OF THE INVENTION

In accordance with the present invention, a video signal is scrambled and then may be descrambled without the presence of a ripple component, by AM gray sync modulation with a sine wave signal which may be distorted logarithmically, exponentially or in some other non-linear fashion, such as a non-linear mathematical power term. In one example of a system in accordance with the invention, horizontal synchronizing signals are separated and employed to control the phase of sine waves of like frequency. The video signal is mixed with the sine wave signal in a logarithmic amplifier, or with a sine wave modified in accordance with an exponential function, so that a distorted sine wave is imposed on the video signal such that the synchronizing signal components are immersed in the gray level and the video signal is non-linearly distorted for transmission. The same characteristic may be imparted on the frequency modulated aural component, as an amplitude modulation characteristic, and the aural signal may thereafter be employed as a time reference in descrambling the video signal to its normal state. In descrambling, an amplitude controlled sine wave of inverted phase relative to the scramble signal may be distorted in a similar fashion to the distortion used in scrambling and used for a compensatory modulation.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
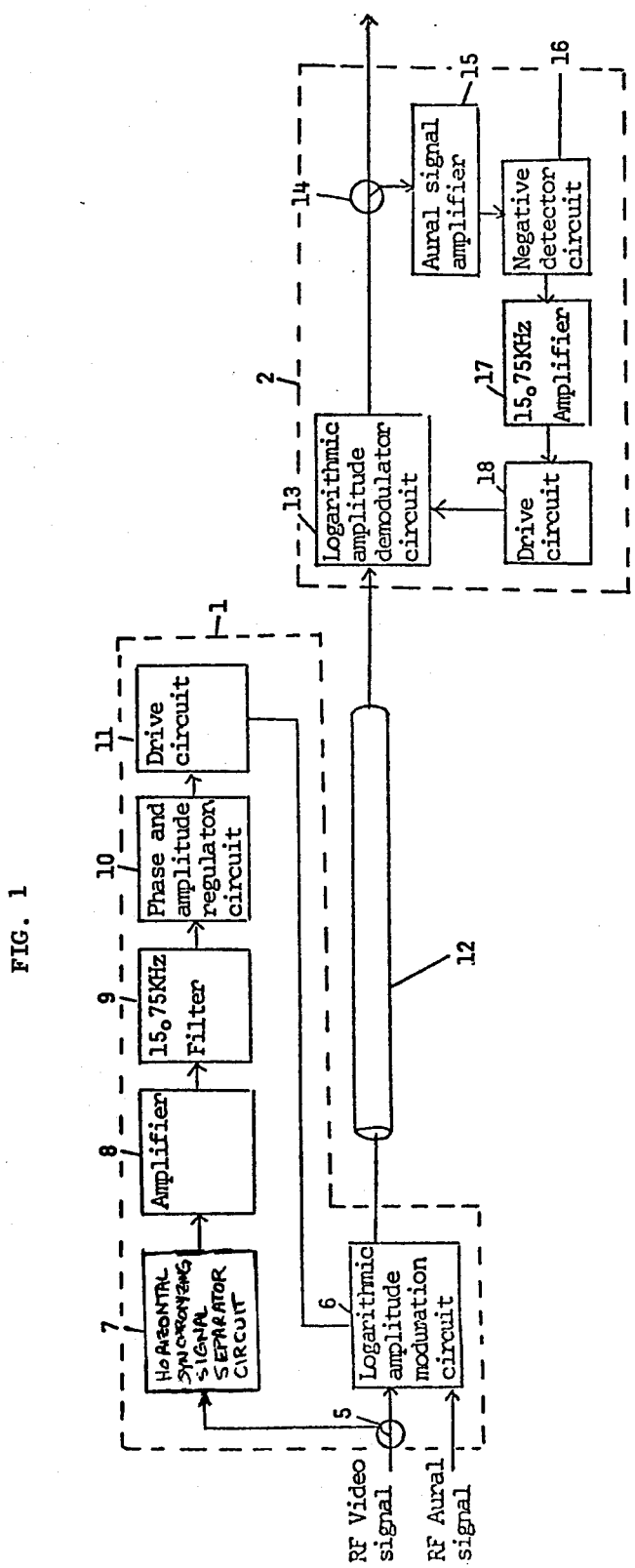
FIG. 1 is a block diagram showing a first example of a system in accordance with the present invention.
Figure 5:
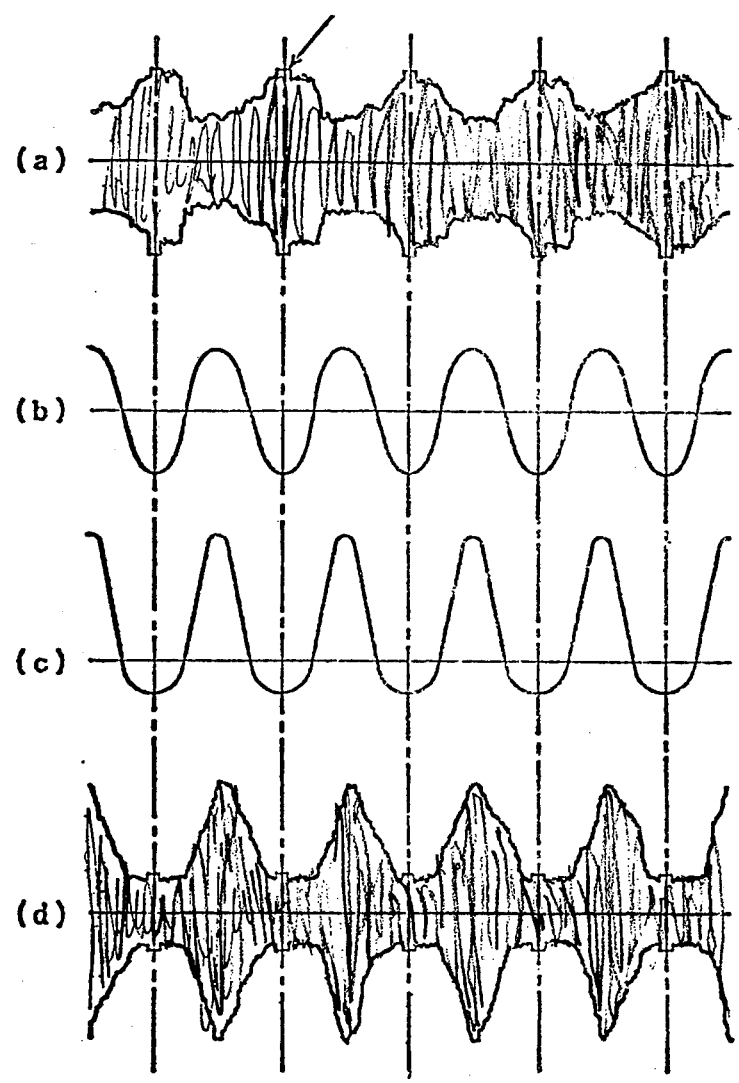
FIG. 5 is a graphical representation of waveforms (a)-(d) useful in explaining the various stages of scrambling of the RF signals.

In FIG. 1, which shows a first embodiment of the invention, there is shown a transmitter (scrambler apparatus as at 1 surrounded by the broken line, and a receiver (descrambler apparatus) as at 2 surrounded by the broken line. Firstly, at the transmitter 1, the RF video signal is partially extracted from a distributor circuit 5 and then applied to a horizontal synchronizing signal separator circuit 7. The horizontal synchronizing signal component of 15.75 KHz is extracted by the horizontal synchronizing signal separator circuit 7, and the resulting extracted synchronizing signal component is applied to a phase and amplitude regulator circuit 10 through an amplifier 8 and a filter 9 which allows 15.75 KHz to pass therethrough. In this circuit 10, the sine wave signal has been regulated in phase so that the phase assumes $n \pi$ (where $n$ is a whole number) relative to the synchronizing signal. Signal waveforms obtained at that time are shown in FIGS. 5(a) and (b). That is, FIG. 5(a) shows the normal RF video signal containing the horizontal synchronizing signal, and FIG. 5(b) shows the sine wave signal or encode signal, which has been regulated in phase so that the phase assumes $n \pi$ (where $n$ is a whose number) at the position of the synchronizing signal contained in the RF video signal. The thus formed sine wave signal is applied to a drive circuit 11, where the sine wave signal is subjected to impedance conversion, after which the signal is applied to a logarithmic amplitude modulation circuit 6 composed of elements having an exponential function characteristic, the RF video signal being scrambled by the amplitude modulation circuit 6. Simultaneously with the scrambling modulation of the RF video signal, the accompanying RF aural signal is also modulated. Signal waveforms obtained at that time are shown in FIG. 5(c) and (d). That is, FIG. 5(c) shows a condition where the sine wave shown in FIG. 5(b) is passed through the exponential function circuit, and FIG. 5(d) shows the RF video signal amplitude-modulated by the signal shown in FIG. 5(c).

The signal scrambled in a manner as described above is transmitted to the receiver through a truck transmission line 12 such as a coaxial cable or the like, but as may be understood from those waveforms as shown in FIG. 5(d), the scrambled RF video signal has horizontal synchronizing signal amplitudes much lower than picture component amplitudes to such extent that if the signal should be reproduced in an image receiver without modification, the horizontal synchronization would not be attained, as a consequence of which a sufficient scramble effect may be obtained.

Next, at the receiver 2, the scrambled signal obtained through the trunk transmission line 12 passes a logarithmic amplitude demodulator circuit 13 (which is identical with the above-mentioned circuit 6) to separate only the RF aural signal by a distributor circuit 14. This RF aural signal is amplified by a narrow band amplifier 15 and is further detected by a negative detector circuit 16 to obtain a decode signal displaced in phase by 180° from that of the sine wave shown in FIG. 5(b). (It should be noted in this case that since the scramble modulation of RF aural signal is in the form of AM, the signal negatively detected by the detector circuit 16 may be utilized without modification). The thus obtained signal is amplified by a narrow band amplifier 17 of 15.75 KHz into a modulation input of the amplitude demodulator circuit 13. Since the provision of a high degree of amplification of the amplifier 17 among a loop composed of the above-mentioned structure which forms the receiver 2 may follow at an extremely high speed, a complete AGC circuit is formed, and the incoming scrambled signal may be subjected to a remodulation or compensatory modulation process by the logarithmic amplitude demodulator circuit 13 in a mode of operation entirely opposite the case where scrambling takes place, to thereby obtain an output signal, which is the same in quality as that of the original signal.

Figure 2:
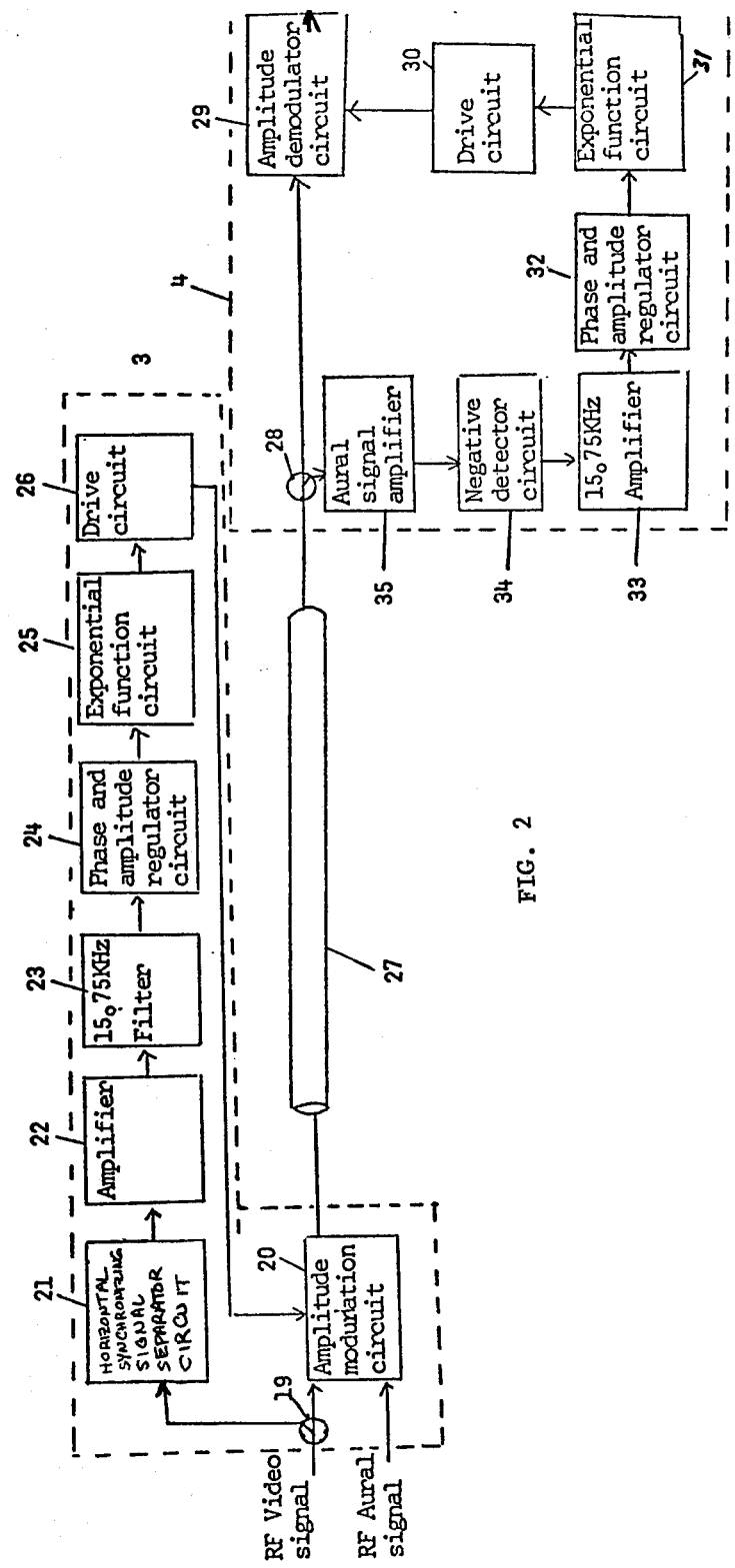
FIG. 2 is a block diagram showing a second example of a system in accordance with the invention.

FIG. 2 shows a second embodiment is accordance with the present invention, which is different in construction from that shown in FIG. 1 in such a point that at the transmitter 1, the sine wave of 15.75 KHz obtained in a phase and amplitude regulator circuit 24 is passed through an exponential function circuit 25 to obtain beforehand the signal as shown in FIG. 5(c), which uses as a modulation input of an amplitude modulation circuit 20 composed of square-law characteristic elements such as field-effect transistors (FET) or the like. The scrambled signal thus obtained results in the same signal as the signal scrambled at the transmitter 1 of FIG. 1. The scrambled signal enters a receiver 4 through a trunk transmission line 27 to first separate the RF aural signal by a distributor 28, and is then converted into a signal having a phase opposite to that shown in FIG. 5(c) through a negative detector circuit 34. This signal is converted into a sine wave having a phase opposite to that shown in FIG. 5(b) by an amplififer 33 having a first characteristic of 15.75 KHz and further passes a phase and amplitude regulator circuit 32 and converterd into a waveform having the relation in phase opposite to that shown in FIG. 5(c) by an exponential function circuit 31. This signal obtained by the exponential function circuit 31 is subjected to impedance conversion by a drive circuit 30, after which the signal is applied to an amplitude demodulator circuit 29 composed of square-law characteristic elements such as FET and thus descrambled with respect to the scrambled RF video signal.

In either method according to FIGS. 1 and 2, the signal waveform scrambled at the transmitter 1 is identical with that scrambled at the transmitter 3, and hence, the receivers 2 and 4 can be exchanged with each other.

Figure 4:
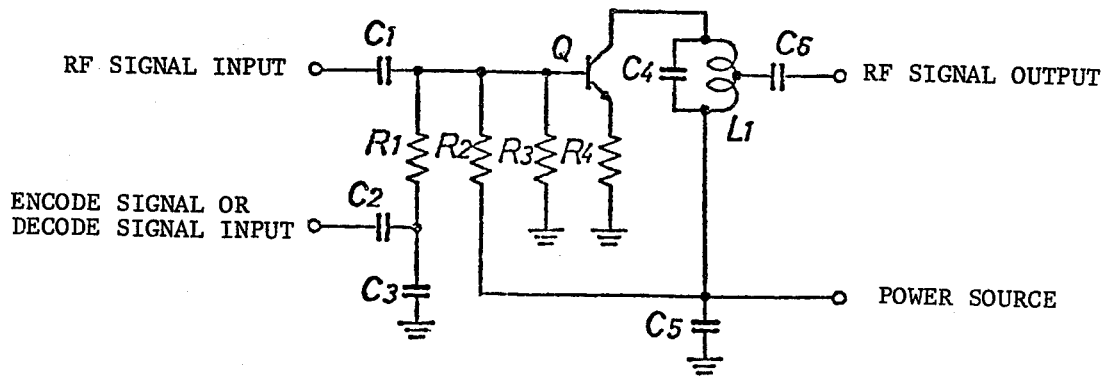
FIG. 4 is a schematic diagram showing one example of a logarithmic amplitude modulator circuit.

FIG. 4 specifically illustrates the above-mentioned logarithmic amplitude modulation circuit 6 and logarithmic amplitude demodulator circuit 13, which will be described hereinafter. As shown in FIG. 4, this circuit comprises on onde side an RF signal input terminal, and on the other side an RF signal output terminal and a power source terminal to transistor Q. The circuit further comprises resistors R1 through R4, capacitors C1 through C6, and a coil L1, of which inductance is so selected that tuning may be made to the carrier frequency of RF signal between the coil L1 and the capacitor C4 connected in parallel therewith.

Figure 3:
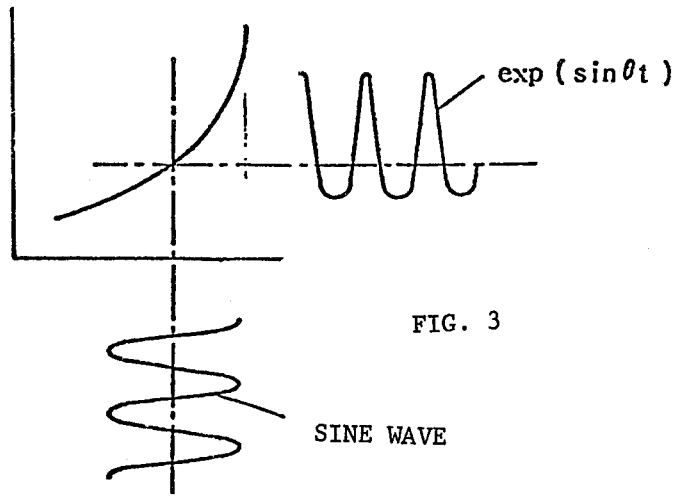
FIG. 3 is a graphical representation of the characteristics of an exponential function circuit.

In the logarithmic amplitude modulator circuit, in the case that the transistor Q is used in a region where collector current $I_C$ is $I_C = 1 \times 10^{-9}$A, the voltage $V_{BE}$ across base and emitter and the collector current $I_C$ have a function as given by $$I_C = A \cdot \exp(KV_{BE}) \text{ (where } A, K \text{ are constants)}$$

with input and output characteristics illustrated in FIG. 3. At this time, the function $gm(V_{BE})$ of amplification degree of transistor Q is given by $$gm(V_{BE}) = \frac{dI_C}{dV_{BE}} = B \cdot \exp(K \cdot V_{BE}) \quad (BE = A \cdot K) \quad (1)$$

Let $V_o$ represent the dc bias voltage and $V_1 \sin \theta t$ the encode signal, then the function of amplification degree when the bias is aided by the encode signal is given by $$gm(V_{BE}) = B \cdot \exp\{K(V_o + V_1 \sin \theta t)\} \quad (2)$$

Also, let $V_1 \cos(\omega t + \phi)$ represent the RF input signal; the RF output voltage, i.e., the scrambled signal $V_o$, is given by $$v_o = B \cdot R_L \cdot \exp\{K(V_o + V_1 \sin \theta t)\} V_1 \cos(\omega t + \phi) \quad (3)$$

where $R_L$ is the load resistance. If the above-mentioned signal is the RF input at the receiver and a circuit similar to the scrambler circuit is the descrambler, and let $V'_o$ represent the dc bias voltage and $-V_1 \sin \theta t$ the decode signal, then the function of amplification degree thereof is given by $$gm(V_{BE}) = B \cdot \exp\{K(V'_o - V_1 \sin \theta t)\} \quad (4),$$

and hence, the output voltage $v_o'$ is given by $$v_o' = B^2 \cdot R^2_L \cdot \exp\{K(V_o' + V_o)\} \cdot V_1 \cos(\omega t + \phi) \quad (5)$$

Since $B^2 \cdot R^2_L \exp\{K(V_o' + V_o)\}$ in equation (5) is a constant, $V_1 \cos(\omega t + \phi)$ may be obtained from the result. As a consequence, the ripple component does not remain as in the prior AM gray sync system mentioned above.

Next, in the second embodiment as shown in FIG. 2, enclouding may be accomplished in a manner such that the dc voltage $V_o$ and sine wave $V_1 \sin \theta t$ are passed through elements (for example, such as diode and transistor) having an exponential function characteristic to obtain $\exp\{K(V_o + V_1 \sin \theta t)\}$. This signal serves as one input of the amplitude modulator, but the amplitude modulator herein used comprises elements having a square-law characteristic and in this case the relationship of amplification degree of the modulation element in the bias is in proportional relation so that let $$gm\ (V_{IN}) = C \cdot V_{IN}\ C: \text{the constant} \quad (6),$$

then the encoding equation becomes $$gm\ (V_{IN}) = C \cdot \exp\{K(V_o + V_1 \sin \theta t)\} \quad (7)$$

Thus, let $V_1 \cos(\omega t + \phi)$ represent the RF signal, then the RF output voltage $v_o$ encoded is given by $$v_o = CR_L \cdot \exp\{K(V_o + V_1 \sin \theta t)\} \cdot V_1 \cos(\omega t + \phi) \quad (8)$$

Since this equation (8) is of the same nature as equation (3), it is obvious that reproduction may be accomplished even in the descrambler 2 in FIG. 1. Further, the descramble method shown in FIG. 2 is such that the decode signal is inverted in phase from that of the encode signal, and decoding may be accomplished in the exactly same method as that of encoding so that the output voltage $v_o'$ at that time becomes $$v_o' = C^2 \cdot R^2_L \cdot \exp\{K(V_o' + V_o)\} \cdot V_1 \cos(\omega t + \phi) \quad (9)$$

and it will be obvious from this equation that the output voltage is the same in nature as that of equation (5).

From the foregoing, it will be apparent that the signal scrambled in FIG. 2 may also be reproduced by the descrambler in FIG. 1.

As described above, the present invention provides apparatus which is characterized in that at the time of scrambling the video signal, logarithmic (or exponential function) amplitude modulation is applied thereto by the encode signal, whereas at the time of descrambling, logarithmic (or exponential function) amplitude modulation is applied to the RF video signal by the decode signal, to thereby eliminate the production of residual rippled components or the like in the RF video signal as in a conventional AM gray sync system and to minimize the deterioration in image quality caused by the utilization of a scrambler and descrambler.

What is claimed is:

1. A scrambler apparatus for the transmission of RF video signals, said apparatus comprising:
    means for separating horizontal synchronizing signal components from the RF video signals;
    means responsive to the separated horizontal synchronizing signal components for generating a sine wave signal synchronized in selected phase relationship to the horizontal synchronizing signal components;
    and amplitude modulator means responsive to the sine wave signal and the RF video signals for (1) varying the sine wave signal in non-linear fashion in accordance with a mathematical power term to generate a non-linearly varied sine wave and (2) modulating the RF video signal with the non-linearly varied sine wave to impart a distorted sinusoidal amplitude modulation onto the RF video signals such that the synchronizing signal components are depressed in relationship to other portions of the video signals.

2. The invention as set forth in claim 1 above, wherein the video signals to be transmitted include an RF aural component and wherein the distorting modulation is applied to both the RF video and RF aural signals.

3. The invention as set forth in claim 1 above, wherein said amplitude modulator means comprises means coupled to receive the RF video and sine wave signals for varying the sine wave signal in accordance with a logarithmic function.

4. The invention as set forth in claim 3 above, wherein said means for generating a sine wave signal comprises filter means responsive to the separated synchronizing signals, and means coupled to said filter means for generating a sine wave of selected phase relation to the RF video signal.

5. The invention as set forth in claim 1 above, wherein said amplitude modulator means comprises means for varying the sine wave signal in accordance with an exponential function.

6. The invention as set forth in claim 5 above, wherein said means for varying comprises filter means responsive to the separated synchronizing signals, means for regulating the phase and amplitude of the signals from the filter means, and exponential function circuit means, all coupled in series.

7. A descrambler for RF video signals having a periodic distortion characteristic that varies non-linearly in accordance with a mathematical power term and is accompanied by a correspondingly distorted aural component, comprising:
    means responsive to the aural component for generating a periodic wave corresponding in periodicity to the periodic distortion of the RF video signals; and
    modulator means coupled to receive said RF video signals and the periodic wave for modulating the video signals in accordance with a non-linear mathematical power term compensating function of the corresponding periodic wave to cancel the distortion during the modulation.

8. The invention as set forth in claim 7 above, wherein said means for generating a periodic wave comprises aural signal detector means and tuned amplifier means tuned to the frequency of the periodic distortion, and wherein said modulator means comprises a logarithmic amplitude modulator.

9. The invention as set forth in claim 7 above, wherein said means for generating a periodic wave comprises aural signal detector means, tuned amplifier means tuned to the frequency of the periodic distortion, and means for adjusting the phase and amplitude of the signal from the tuned amplifier means, all coupled in series, and wherein said non-linear modulator means comprises exponential function circuit means coupled to receive the phase and amplitude adjusted signal, and amplitude modulator means coupled to receive the RF video signals and the signal from the exponential function circuit means for imposing a compensatory non-linear modulation on the RF video signals.

10. A scrambler and descrambler system for transmitted and received television signals having both RF video and RF aural components, the RF video component having a periodic horizontal synchronizing signal component, the system comprising:
  means responsive to the RF video and RF aural components for concurrently modulating both components for transmission with a periodic non-linear component synchronous with the horizontal synchronizing signal component, the periodic non-linear component varying in accordance with a mathematical power term and being so disposed in phase as to invert the modulation relationship of the horizontal synchronizing signal component;
  and means responsive to the received RF video and aural components for remodulating the RF video signals with a compensatory periodic non-linear component varying in accordance with the same mathematical power term in response to the periodic non-linear component in the RF aural component whereby the scrambling distortion introduced by said modulation is cancelled on remodulation.

11. The invention as set forth in claim 10 above, wherein the modulation and remodulation both vary in accordance with a logarithmic function.

12. The invention as set forth in claim 10 above, wherein the modulation and remodulation both vary in accordance with an exponential function.

* * * * *

UNITED STATES PATENT AND TRADEMARK OFFICE
CERTIFICATE OF CORRECTION

PATENT NO. : 4,064,536
DATED : December 20, 1977
INVENTOR(S) : Yoshifumi Saeki and Hiroki Uemura It is certified that error appears in the above-identified patent and that said Letters Patent are hereby corrected as shown below:

Column 1, line 6, after "a" and before "apparatus", "scramble" should read --scrambler--. Column 2, line 64, after "a" and before "number", "whose" should read --whole--. Column 3, line 14, after "a" and before "transmis-", "truck" should read --trunk--. Column 4, line 1, before "33", "plififer" should read --plifier--; line 1, after "a" and before "characteristic", "first" should read --filter--; line 2, after "passes" and before "a", insert --through--; line 3, after "and" and before "into", "converterd" should read --converter--; line 20, after "on" and before "side", "onde" should read --one--. Column 5, line 4, "encloding" should read --encoding--.

Signed and Sealed this

Sixteenth Day of May 1978

[SEAL]

Attest:

RUTH C. MASON
Attesting Officer

LUTRELLE F. PARKER
Acting Commissioner of Patents and Trademarks